United States Patent
Wang et al.

(10) Patent No.: US 11,600,099 B2
(45) Date of Patent: Mar. 7, 2023

(54) BIOLOGICAL FEATURE IDENTIFICATION DEVICE AND MANUFACTURING METHOD OF THE SAME

(71) Applicant: AU Optronics Corporation, Hsin-Chu (TW)

(72) Inventors: Shuo-Hong Wang, Hsin-Chu (TW); Chao-Chien Chiu, Hsin-Chu (TW); Shang-Wei Hsieh, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 17/381,393

(22) Filed: Jul. 21, 2021

(65) Prior Publication Data

US 2022/0050992 A1     Feb. 17, 2022

Related U.S. Application Data

(60) Provisional application No. 63/066,416, filed on Aug. 17, 2020.

(30) Foreign Application Priority Data

Jun. 18, 2021   (TW) .................................. 110122475

(51) Int. Cl.
*G06V 40/13*     (2022.01)
*G06V 40/12*     (2022.01)
(52) U.S. Cl.
CPC ...... *G06V 40/1318* (2022.01); *G06V 40/1359* (2022.01)

(58) Field of Classification Search
None
See application file for complete search history.

(56) References Cited

U.S. PATENT DOCUMENTS

| 11,017,200 | B1* | 5/2021 | Wickboldt ............ H04M 1/026 |
| 2018/0239941 | A1 | 8/2018 | Mackey et al. |
| 2020/0117875 | A1 | 4/2020 | Cai et al. |

FOREIGN PATENT DOCUMENTS

| CN | 111178351 A | 5/2020 |
| CN | 111563426 A | 8/2020 |
| CN | 111652194 A | 9/2020 |

* cited by examiner

*Primary Examiner* — Joseph R Haley
(74) *Attorney, Agent, or Firm* — WPAT, PC

(57) ABSTRACT

A biological feature identification device includes a display device and a sensing device. The display device includes multiple pixels arranged along a first direction. The pixels each has a sub-pixel having a display element and a switch element. The sensing device includes multiple sensing units arranged along a second direction. The sensing units each has a sensing element. When the spatial frequency relation is |4*(RE/100)−(1/SU)|>A, the first and second directions are the same, and the biological feature identification device satisfy the criteria: A<|4*(RE/100)−(1/SU)|<B. When the spatial frequency relation is |4*(RE/100)−(1/SU)|≤A, the first and second directions form an angle, and the biological feature identification device satisfy the criteria: A<|4*(RE/100)−{1/[SU*Cos(α)]}|<C. RE is the resolution of the display device, SU is the sensing unit size, α is the angle, 0°<α<90°, B and C>A, and A is not equal to zero.

6 Claims, 10 Drawing Sheets

BIOLOGICAL FEATURE IDENTIFICATION DEVICE AND MANUFACTURING METHOD OF THE SAME

CROSS-REFERENCE TO RELATED APPLICATION

This application claims priority to Taiwan Application Serial Number 110122475, filed Jun. 18, 2021, and U.S. Provisional Application Ser. No. 63/066,416, filed Aug. 17, 2020, which are herein incorporated by reference in their entirety.

BACKGROUND

Field of Invention

The present invention relates to a biological feature identification device and a manufacturing method of the biological feature identification device.

Description of Related Art

The electronic devices nowadays have the identification recognition mechanism. The biological feature identification method has formed a trend. Since the finger print sensor is easy to be integrated in the electronic device, the fingerprint identification became a common method. However, the regular arrangement of the display pixels and sensing elements may cause moire patterns in the current biological feature identification device, such that incorrect recognition or low precision image recognition may occur.

Accordingly, it is still a development direction for the industry to provide a biological feature identification device which can eliminate moire patterns.

SUMMARY

One aspect of the invention provides a biological feature identification device.

In some embodiments, the biological feature identification device includes a display device and a sensing device overlapped with the display device. The display device includes multiple pixels arranged along a first direction. At least one of the pixels has at least one sub-pixel, and the sub-pixel includes at least one display element and at least one switch element electrically connected to the display element. The sensing device includes multiple sensing units respectively corresponding to the pixels. The sensing units are arranged along a second direction, and each of the sensing units has at least one sensing element. When the spatial frequency relation between the display device and the sensing device is |4*(RE/100)−(1/SU)|>A, the first direction and the second direction are the same, and the biological feature identification device satisfy the criteria: A<|4*(RE/100)−(1/SU)|<B. When the spatial frequency relation between the display device and the sensing device is |4*(RE/100)−(1/SU)|≤A, the first direction and the second direction form an angle, and the biological feature identification device satisfy the criteria: A<|4*(RE/100)−{1/[SU*Cos(α)]}|<C. RE is the resolution of the display device, SU is the sensing unit size, α is the angle, 0°<α<90°, B and C>A, and A is not equal to zero.

In some embodiments, A is a spatial frequency of the biological feature, and the biological feature includes multiple repeating patterns, and the spatial frequency is a reciprocal of a distance between adjacent ridges or valleys of the repeating patterns of the biological feature.

In some embodiments, A is in a range of about 2 mm$^{-1}$ to 5 mm$^{-1}$.

In some embodiments, B is in a range of about 9 mm$^{-1}$ to 11 mm$^{-1}$.

In some embodiments, C is in a range of about 10 mm$^{-1}$ to 18 mm$^{-1}$.

In some embodiments, the biological feature identification device of claim 1 further includes an optical adjusting layer disposed between the display device and the sensing device. The optical adjusting layer has two shielding portions adjacent to each other and at least one light-transmitting portion between the two shielding portions, and the light-transmitting portion corresponds to a portion of the at least one sensing element of each of the sensing unit.

Another aspect of the invention provides a manufacturing method of a biological feature identification device.

In some embodiments, the manufacturing method includes overlapping a display device with a sensing device and calculating a value of |4*(RE/100)−(1/SU)|. The display device includes multiple pixels, the pixels arranged along a first direction. At least one of the pixels has at least one sub-pixel, and the sub-pixel includes at least one display element and at least one switch element electrically connected to the display element. The sensing device includes multiple sensing units respectively corresponding to the pixels. The sensing units are arranged along a second direction, and each of the sensing units has at least one sensing element. When |4*(RE/100)−(1/SU)|>A, the first direction and the second direction are the same, and the biological feature identification device satisfy the criteria: A<|4*(RE/100)−(1/SU)|<B. When |4*(RE/100)−(1/SU)|≤A, rotate one of the display device and the sensing device such that the first direction and the second direction form an angle, and the biological feature identification device satisfy the criteria: A<|4*(RE/100)−{1/[SU*Cos(α)]}|<C. RE is the resolution of the display device, SU is a size of the sensing unit, α is the angle, 0°<α<90°, B and C>A, and A is not equal to zero.

In some embodiments, A is a spatial frequency of the biological feature, and the biological feature includes multiple repeating patterns, and the spatial frequency is a reciprocal of a distance between adjacent ridges or valleys of the repeating patterns of the biological feature.

In some embodiments, A is in a range of about 2 mm$^{-1}$ to 5 mm$^{-1}$.

In some embodiments, B is in a range of about 9 mm$^{-1}$ to 11 mm$^{-1}$.

In some embodiments, C is in a range of about 10 mm$^{-1}$ to 18 mm$^{-1}$.

In some embodiments, the manufacturing method further includes disposing an optical adjusting layer between the display device and the sensing device. The optical adjusting layer has two shielding portions adjacent to each other and at least one light-transmitting portion between the two shielding portions, and the at least one light-transmitting portion corresponds to a portion of the at least one sensing element of each of the sensing unit.

In the aforementioned embodiments, a moire pattern can be efficiently eliminated to prevent incorrect recognition and image recognition precision decreasing problem by making the biological feature identification device of the present disclosure satisfy the condition A<|4*(RE/100)−(1/SU)|<B or A<|4*(RE/100)−{1/[SU*Cos(α)]}|<C.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
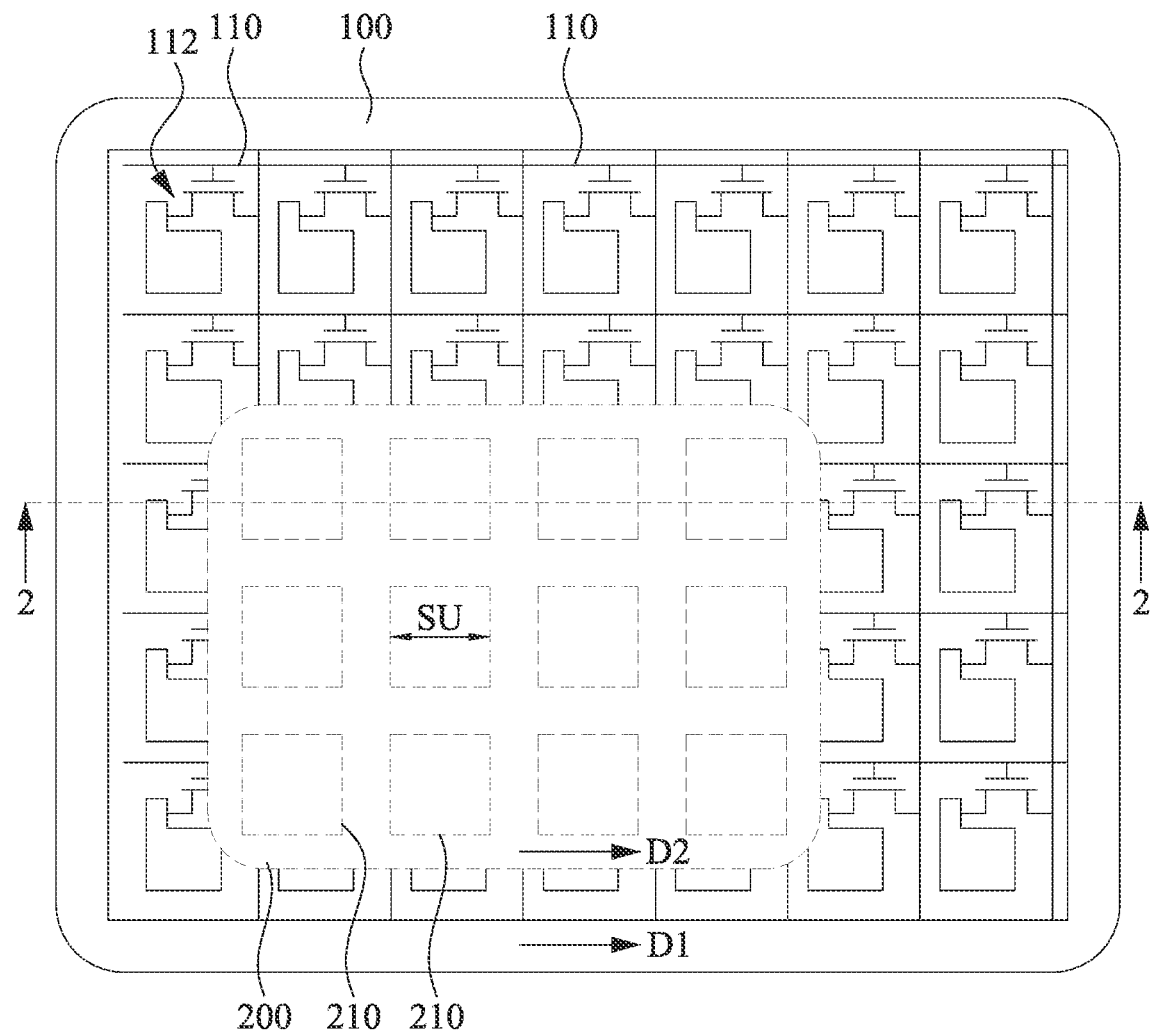
FIG. 1 is a top view of a biological feature identification device according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
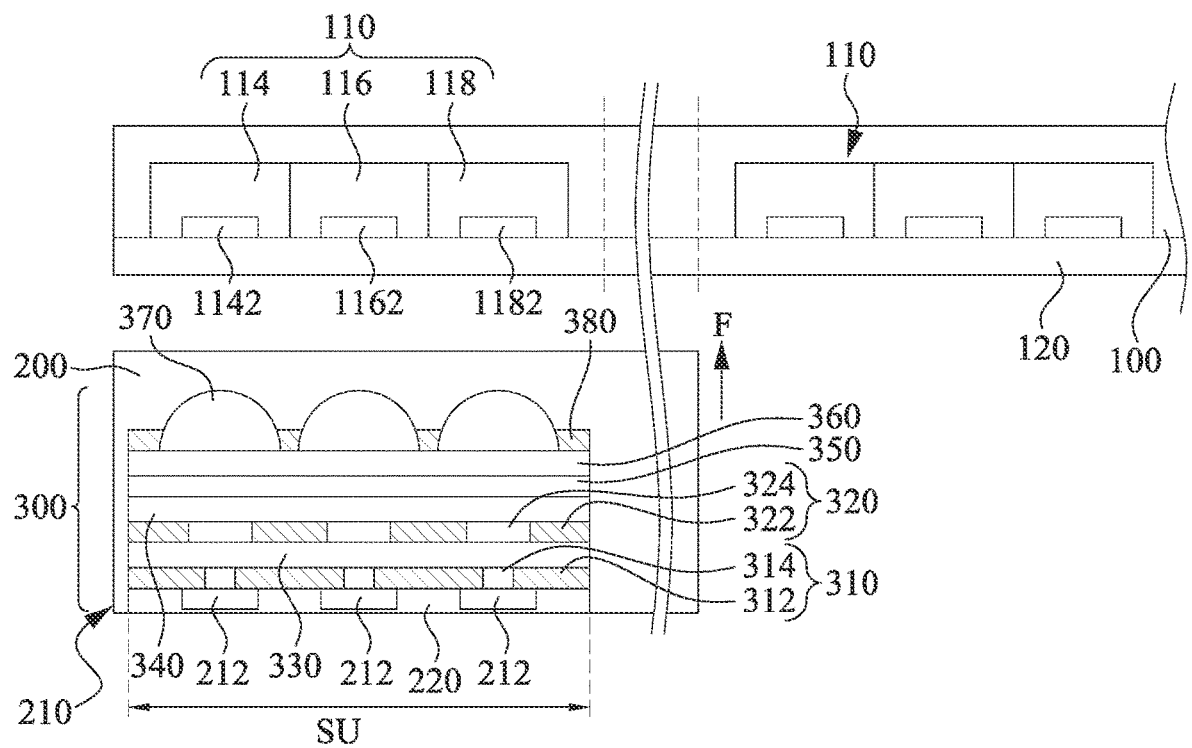
FIG. 2 is a partial cross-sectional view taken along line 2-2 in FIG. 1.

FIG. 1 is a top view of a biological feature identification device 10 according to one embodiment of the present disclosure. FIG. 2 is a partial cross-sectional view taken along line 2-2 in FIG. 1. Reference is made to FIG. 1 and FIG. 2 simultaneously. The biological feature identification device 10 includes a display device 100 and a sensing device 200. The sensing device 200 is overlapped with the display device 100. The biological feature identification device 10 has the identification function for the biological feature, such as fingerprint identification. The biological feature identification device 10 can identify the features formed by the ridges and the valleys of the fingerprint, but the present disclosure is not limited in this regard.

The display device 100 includes multiple pixels 110, and the pixels 110 are arranged along a first direction D1. Each of the pixels 110 has a switch element 112. The sensing device 200 includes multiple sensing units 210, and the sensing units 210 are arranged along a second direction D2. In the present embodiment, the first direction D1 is parallel to the second direction D2. Specifically, multiple pixels 110 form a pixel array, and each rows of the pixel array are formed by the pixels 110 arranged along the first direction D1. Multiple sensing units 210 form a sensor array, and each rows of the sensor array are formed by the sensing units 210 arranged along the first direction D1. In other words, the display device 100 and the sensing device 200 of the present embodiment have no relative angular displacement.

The pixels 110 are disposed corresponding to the sensing units 210 respectively. In the present embodiment, the relation between the pixels 110 and the sensing units 210 are mutually overlapping along the orthogonal projection direction. In other words, the sensing device 200 and the display device 100 are respectively disposed on the substrate 120 and the substrate 220. Under the sight view of FIG. 1, the sensing device 200 is located under the display device 100, and therefore the sensing device 200 is demonstrated by dashed line. It is noted that the portion of the display device 100 that is overlapped with the sensing device 200 is omitted for the convenience to describe. In other embodiment, the sensing device 200 can be located above the display device 100.

Figure 3:
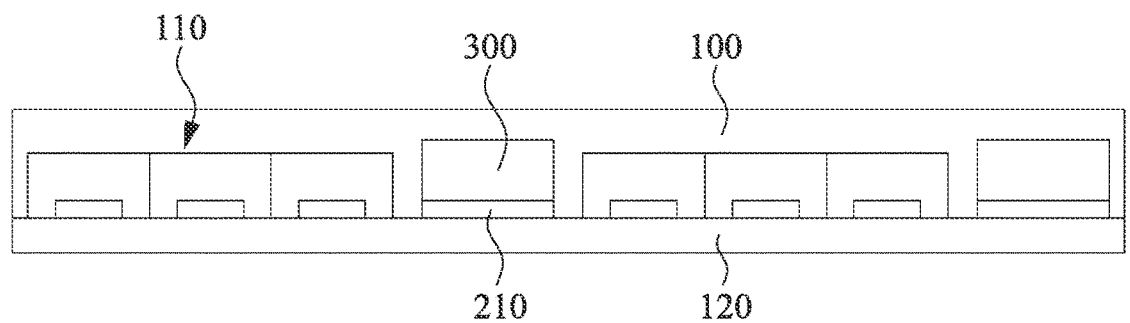
FIG. 3 is a partial cross-sectional view of a biological feature identification device according to another embodiment of the present disclosure.

FIG. 3 is a partial cross-sectional view of a biological feature identification device 10a according to another embodiment of the present disclosure. The relation between the pixels 110 and the sensing units 210 of the biological feature identification device 10a is that they are free from overlapping along the orthogonal projection direction. In other words, the sensing device 200 and the display device 100 are disposed on the same substrate 120.

Reference is made to FIG. 2, each of the pixels 110 of the display device 100 has at least one sub-pixel, and three sub-pixels 114, 116, 118 are demonstrated in the present embodiment, but the present disclosure is not limited in this regard. The sub-pixels 114, 116, 118 respectively have display elements 1142, 1162, and 1182. The display elements 1142, 1162, and 1182 are electrically connected with the switch element 112. In the present embodiment, and the display device 100 is an organic light-emitting diodes (OLED), the display elements 1142, 1162, 1182 are self-luminous elements so as to respectively emit red light, blue light, and green light, but the present disclosure is not limited in this regard. In other embodiments, each of the pixels 114, 116, 118 may not be self-luminous element.

Reference is made to FIG. 2, the sensing units 210 have sensing elements 212. In the present embodiment, the preferred sensing elements 212 are optical sensing element. The materials of the optical sensing elements includes organic material, inorganic material, or other suitable material for optical sensing element, composite material or stacked material of those mentioned materials.

Reference is made to FIG. 2, the biological feature identification device 10 further includes an optical adjusting layer 300 disposed between the display device 100 and the sensing device 200. The optical adjusting layer 300 includes a first shielding layer 310, a second shielding layer 320, a first dielectric layer 330, and a second dielectric layer 340. The first dielectric layer 330 is located on the first shielding layer 310, and the second dielectric layer 340 is located on the second shielding layer 320. The first shielding layer 310 is disposed between the sensing elements 212 and the first dielectric layer 330, and the second shielding layer 320 is disposed between the first dielectric layer 330 and the second dielectric layer 340. In other embodiments, the optical adjusting layer 300 can includes only one shielding layer and one dielectric layer.

The first shielding layer 310 has multiple first shielding portions 312 and multiple first light-transmitting portions 314 located between adjacent two of the first shielding portions 312. The second shielding layer 320 has multiple second shielding portions 322 and multiple second light-transmitting portions 324 located between adjacent two of the second shielding portions 322. For example, the materials of the first shielding layer 310 and the second shielding layer 320 can be metal, organic material, or inorganic material. The first light-transmitting portions 314 and the second light-transmitting portions 324 are holes in the first shielding layer 310 and the second shielding layer 320 respectively, such that the light can pass through the holes. The first shielding portions 312 and the second shielding portions 322 have light shielding effect, and the first shielding layer 310 and the second shielding layer 320 can filter the light traveling with large angle so as to filter noise.

The first light-transmitting portions 314 and/or the second light-transmitting portions 324 are respectively correspond to a portion of each of the sensing elements 212. In the present embodiment, the first light-transmitting portions 314 are respectively overlapping with a portion of each of the sensing elements 212, and the second light-transmitting portions 324 are respectively overlapping with a portion of each of the first light-transmitting portions 314. Therefore, the optical adjusting layer 300 of the present disclosure is configured to make a greater percentage of light to enter the sensing elements 212 along the normal direction F.

In some other embodiment, the first light-transmitting portions 314 and/or the second light-transmitting portions 324 are not overlapping with a portion of each of the sensing elements 212. Or, in some other embodiments, the second light-transmitting portions 324 may also not overlapped with the first light-transmitting portions 314. In the aforementioned embodiments, the optical adjusting layer 300 can make a greater percentage of light to enter the sensing elements 212 along the normal direction F.

The biological feature identification device 10 of the present embodiment further includes an infrared light cut film 350 (IR-cutting film) configured to block infrared light and maintain light transmission of visible light. In other embodiments, the biological feature identification device may have no infrared light cutting film 350.

The biological feature identification device 10 of the present embodiment further includes a third dielectric layer 360 located on the infrared light cut film 350 and multiple micro lenses 370 located on the third dielectric layer 360, and the micro lenses 370 are separated by the third shielding layer 380, but the present disclosure is not limited in these regards. The micro lenses 370 of the present embodiment correspond to the sensing elements 212. The micro lenses 370 can convergence reflective light from the fingers such that the reflective light may travel to the sensing elements 212 through the corresponding second light-transmitting portions 324 and the first light-transmitting portions 314. The sensing elements 212 can convergence the reflective light so as to get the fingerprint image. In other embodiments, the biological feature identification device may have no micro lenses 370.

In the present embodiment, the biological feature identification device 10 has the resolution RE. Each sensing units 210 has the sensing unit size SU, and the sensing unit size SU is the width of the sensing units 210 along the second direction D2. The biological feature identification device 10 of the present embodiment satisfy the following criteria:

$$A < |4*(RE/100)-(1/SU)| < B \qquad \text{Equation (1)}$$

B is greater than A, and A is not equal to zero. A in equation (1) is the spatial frequency of the biological feature. The biological feature has multiple repeating patterns such as ridges and valleys of the fingerprint. Therefore, the spatial frequency of the biological feature is a reciprocal of a distance between adjacent valleys or ridges of the repeating patterns of the biological feature.

For example, the distance of adjacent two ridges or valleys of the fingerprint of an adult is in a range of about 300 um to 500 um, and the corresponding spatial frequency (that is the reciprocal of the distance) is in a range of about 2 mm$^{-1}$ to 3 mm$^{-1}$. The distance of adjacent two ridges or valleys of the fingerprint of a child is in a range of about 100 um to 300 um, and the corresponding spatial frequency (that is the reciprocal of the distance) is in a range of about 3 mm$^{-1}$ to 10 mm$^{-1}$. In some embodiments for thinner fingerprint of an adult (~200 um), A is in a range of about 2 mm$^{-1}$ to 5 mm$^{-1}$.

4*(RE/100) in equation (1) is the spatial frequency of the resolution RE of the display device 100, which is the reciprocal of the size of the pixels 110. For example, in some embodiments, the resolution RE is about 300 ppi (pixels per inch) to 700 ppi, and the corresponding size of single pixel is in a range of about 0.036 mm to 0.085 mm, but the present disclosure is not limited in this regard. Therefore, the spatial frequency of the resolution RE is in a range of about 11.8 mm$^{-1}$ to 27.6 mm$^{-1}$, and the value of the spatial frequency can be represented as 4*(RE/100) mm$^{-1}$.

(1/SU) in equation (1) is the spatial frequency of the sensing units 210, which is the reciprocal of the sensing unit size SU. In some embodiments, the sensing unit size SU is in a range of about 30 um to 70 um, and the corresponding spatial frequency is in a range of about 14.3 mm$^{-1}$ to 33.3 mm$^{-1}$.

In some preferred embodiments, B in equation (1) is in a range of about 9 mm$^{-1}$ to 11 mm$^{-1}$. The value of B is determined by the resolution RE and the sensing unit size SU of the display device 100. For example, in the embodiments shown in FIG. 1 and FIG. 2, of which the display device 100 and the sensing device 200 have no relative angular displacement, the spatial frequency A of the biological feature is equal to 3 which equals to the value of the intersection of fingerprint features from people with different ages or genders. With aforementioned conditions, the biological feature identification device 10 satisfy the following criteria:

$$3 < |4*(RE/100)-(1/SU)| < 9 \qquad \text{Equation (2)}$$

For example, when the resolution RE of the display device 100 is 522 ppi, and the sensing unit size US is 70 um, the equation been calculated is: |4*(RE/100)-(1/SU)|=6.58 mm$^{-1}$. When the biological feature identification device 10 satisfies aforementioned criteria, it can prevent the moire pattern that may affect image recognition precision. In the following paragraphs, it will be described with image analysis and data.

In some other embodiments, the biological feature identification device 10 can be a 4K display device, such as the display device with 3840×2160 pixels or 4096×2160 pixels. The 4K display device may have different resolution that depend on sizes of various display device. With such conditions, the biological feature identification device can satisfy the following criteria:

$$3 < |4*(RE/100)-(1/SU)| < 11 \qquad \text{Equation (3)}$$

Similarly, when the biological feature identification device 10 satisfies aforementioned criteria, it can prevent the moire pattern that may affect image recognition precision.

Figure 4A:
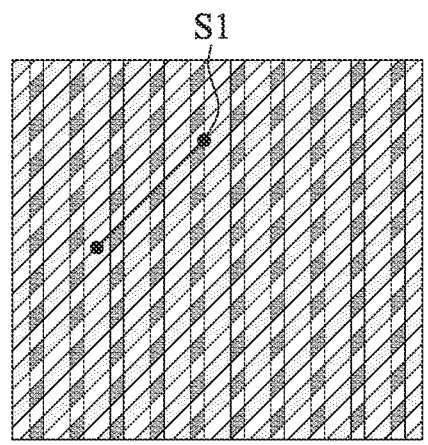
FIG. 4A is a line pair image acquired by a conventional biological feature identification device.
Figure 4A:
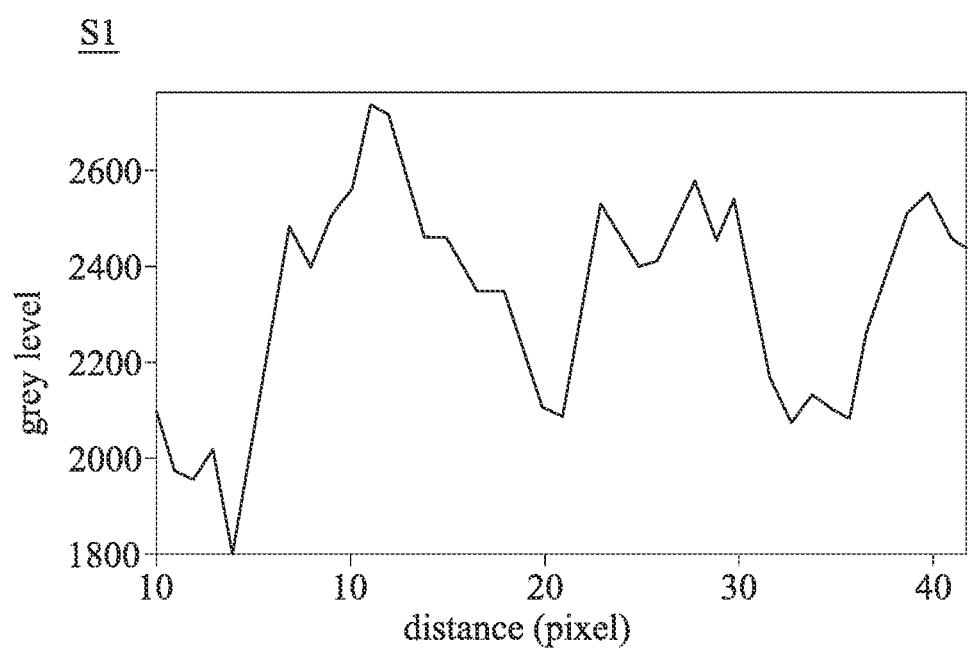
Figure 4B:
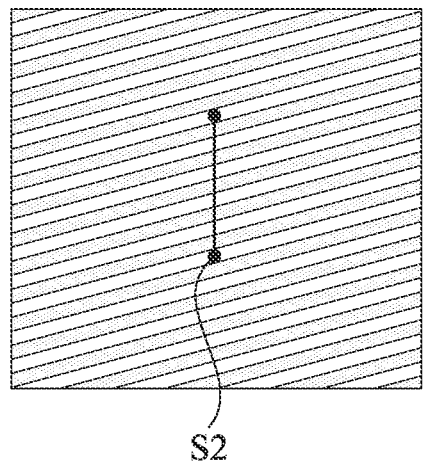
FIG. 4B is a line pair image acquired by the biological feature identification device in FIG. 1.
Figure 4B:
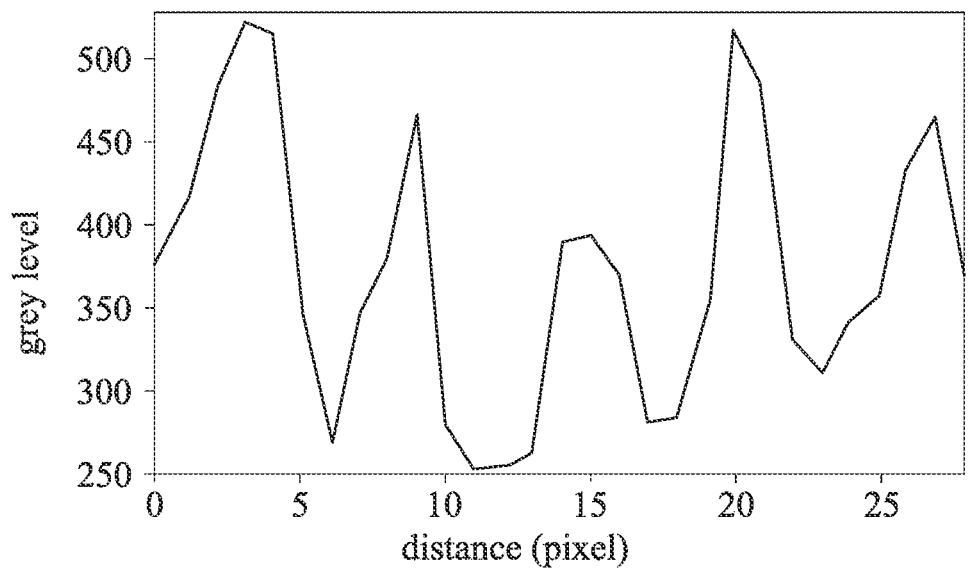

FIG. 4A is a line pair image acquired by a conventional biological feature identification device. FIG. 4B is a line pair image acquired by the biological feature identification device 10 in FIG. 1. The line pair images which simulate the distance between adjacent ridges or valleys of 400 um are used as image analysis target in FIG. 4A and FIG. 4B, and the line pair images include inclined stripes. As shown in the upper image in FIG. 4A, obvious moire pattern distributed along the vertical direction can be seen in the image acquired by the conventional biological feature identification device.

As shown in the lower diagram in FIG. 4A, gray level of a section S1 of selected data indicates peak and valley formed by the moire pattern obviously, and the corresponding image contrast is 98.0 mV.

As shown in the upper image in FIG. 4B, features of line pair can be seen in the image acquired by the biological feature identification device 10. As shown in the lower diagram in FIG. 4B, gray level of a section S2 of selected data indicates peak and valley in accordance with the line pair, and the corresponding image contrast is 41.0 mV.

According to the image analysis results in FIG. 4A and FIG. 4B, the image contrast affected by the moire pattern (98.0 mV) is greater than the image contrast of the line pair without being affected by the moire pattern (41.0 mV). Therefore, the moire pattern may be incorrectly recognized as the line pair in the image analysis result, thereby producing misinformation between the image analysis result and the information of actual image. Accordingly, the moire pattern can be efficiently eliminated to prevent incorrect recognition and image recognition precision decreasing problem by make the biological feature identification device 10 satisfy at least one of the condition of aforementioned equation (1)~equation (3).

Figure 5A:
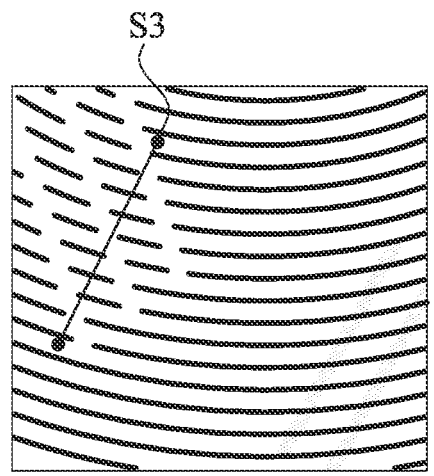
FIG. 5A is a fingerprint copy image acquired by a conventional biological feature identification device.
Figure 5A:
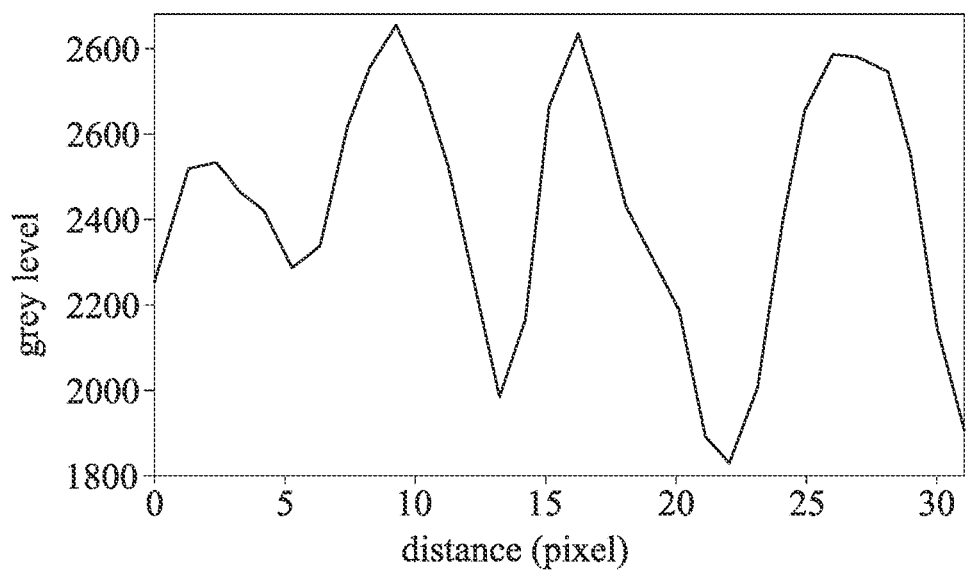
Figure 5B:
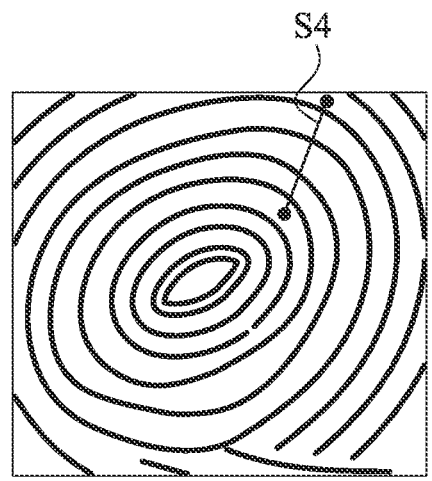
FIG. 5B is a fingerprint copy image acquired by the biological feature identification device in FIG. 1.
Figure 5B:
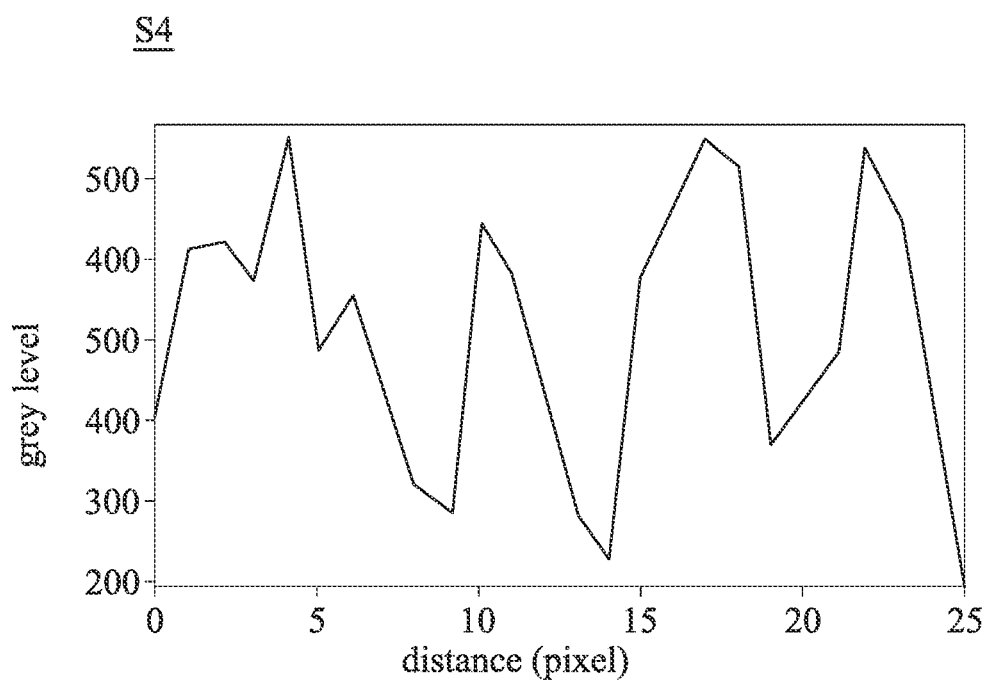

FIG. 5A is a fingerprint copy image acquired by a conventional biological feature identification device. FIG. 5B is a fingerprint copy image acquired by the biological feature identification device 10 in FIG. 1. The actual fingerprint consists of ridges or valleys with different spatial frequencies, and therefore the distances between adjacent ridges or valleys can be in a range of about 300 um to 800 um. Fingerprint copy images are used as an image analysis target in FIG. 5A and FIG. 5B.

As shown in the upper image in FIG. 5A, moire pattern having inclined stripes can be seen in the image acquired by the conventional biological feature identification device. As shown in the lower diagram in FIG. 5A, gray level of a section S3 of selected data indicates peak and valley formed by the moire pattern obviously, and the corresponding image contrast is 156.2 mV.

As shown in the upper image in FIG. 5B, features of ridges or valleys can be seen in the image acquired by the biological feature identification device 10. As shown in the lower diagram in FIG. 5B, gray level of a section S4 of selected data indicates peak and valley in accordance with the line pair, and the corresponding image contrast is 70.3 mV.

According to the image analysis results in FIG. 5A and FIG. 5B, the image contrast affected by the moire pattern (156.2 mV) is greater than the image contrast of the line pair without being affected by the moire pattern (70.3 mV). Therefore, the moire pattern may be incorrectly recognized as the line pair through the image analysis result, thereby producing misinformation between the image analysis result and the information of actual image. Accordingly, the moire pattern can be efficiently eliminated to prevent incorrect recognition and image recognition precision decreasing problem by make the biological feature identification device 10 satisfy at least one of the condition of aforementioned equation (1)~equation (3).

Figure 6:
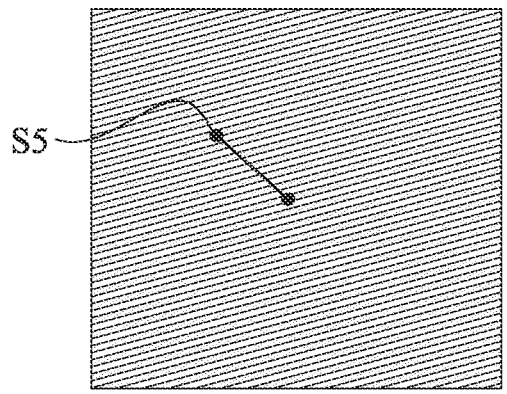
FIG. 6 is a line pair image acquired by the biological feature identification device in FIG. 1.
Figure 6:
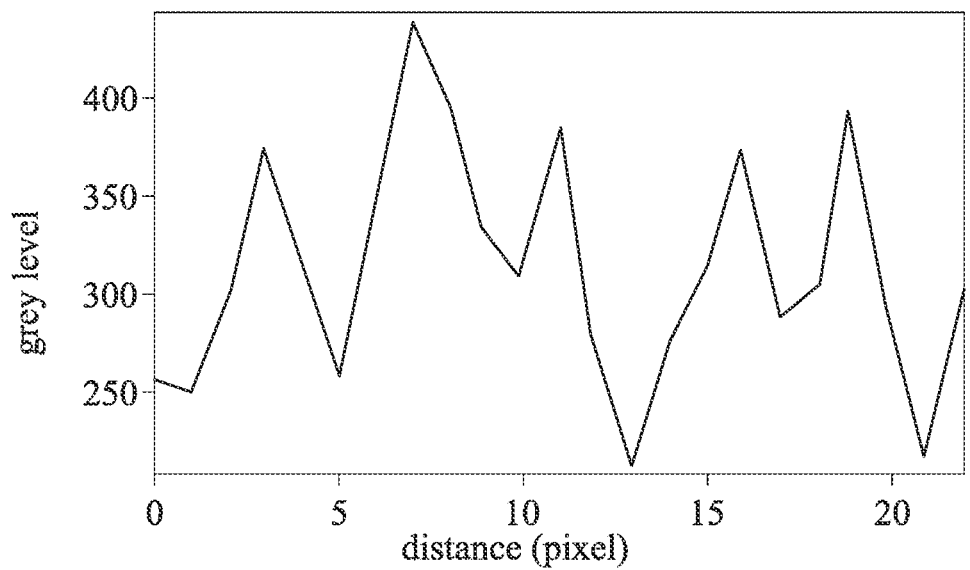

FIG. 6 is a line pair image acquired by the biological feature identification device 10 in FIG. 1. The line pair image which simulates the distance between adjacent ridges or valleys of 300 um is used as image analysis target in FIG. 6, and the line pair image includes inclined stripes. Features of line pair can be seen in the image acquired by the biological feature identification device 10. As shown in the diagram of grey level and distance of the lower part of FIG. 6, gray level of a section S5 of selected data indicates peak and valley in accordance with the line pair, and the corresponding image contrast is 29.3 mV.

Figure 7:
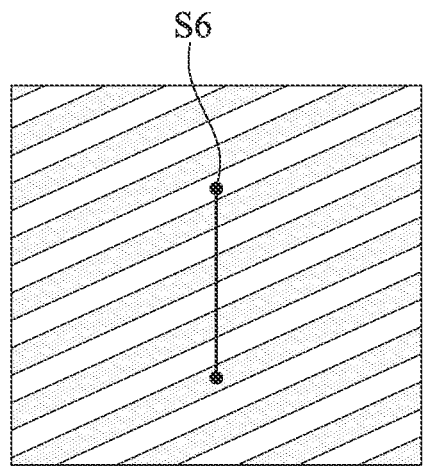
FIG. 7 is a line pair image acquired by the biological feature identification device in FIG. 1.
Figure 7:
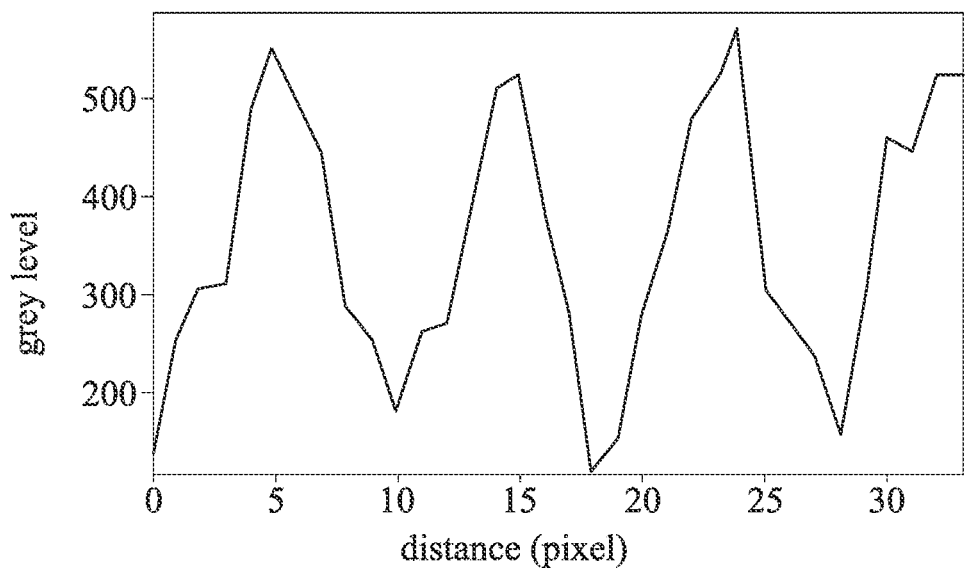

FIG. 7 is a line pair image acquired by the biological feature identification device 10 in FIG. 1. The line pair image which simulates the distance between adjacent ridges or valleys of 600 um is used as image analysis target in FIG. 7, and the line pair image includes inclined stripes. Features of line pair can be seen in the image acquired by the biological feature identification device 10. As shown in the diagram of grey level and distance of the lower part of FIG. 7, gray level of a section S6 of selected data indicates peak and valley in accordance with the line pair, and the corresponding image contrast is 80.1 mV.

Figure 8:
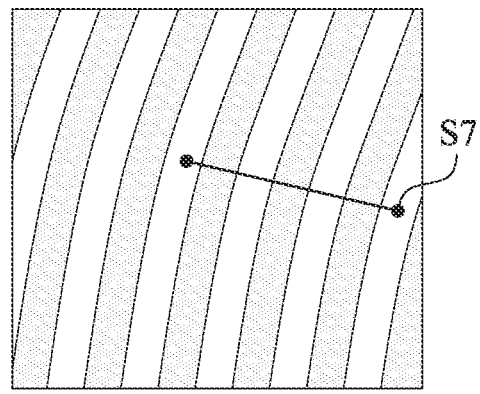
FIG. 8 is a line pair image acquired by the biological feature identification device in FIG. 1.
Figure 8:
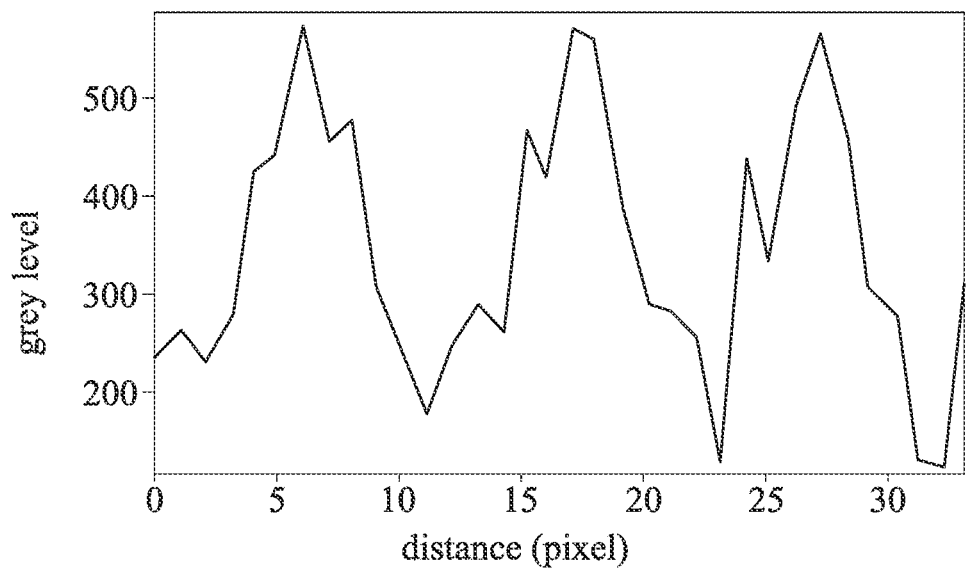

FIG. 8 is a line pair image acquired by the biological feature identification device 10 in FIG. 1. The line pair image which simulates the distance between adjacent ridges or valleys of 800 um is used as image analysis target in FIG. 8. The line pair image includes inclined stripes. Features of line pair can be seen in the image acquired by the biological feature identification device 10. As shown in the diagram of grey level and distance of the lower part of FIG. 8, gray level of a section S7 of selected data indicates peak and valley in accordance with the line pair, and the corresponding image contrast is 87.9 mV.

According to the images acquired by the biological feature identification device 10 shown in FIG. 4B, FIG. 6 to FIG. 8, the line pair density is smaller when the image contrast is greater, which is in consistent with the tendency derived from the analysis results of line pair images. Accordingly, the line pair images in FIG. 4B, FIG. 6 to FIG. 8 are less affected by moire pattern, and therefore the image recognition precision is higher such that the image recognition precision of actual fingerprint (that is, a mix of features of different spatial frequency) can be assured.

Figure 9:
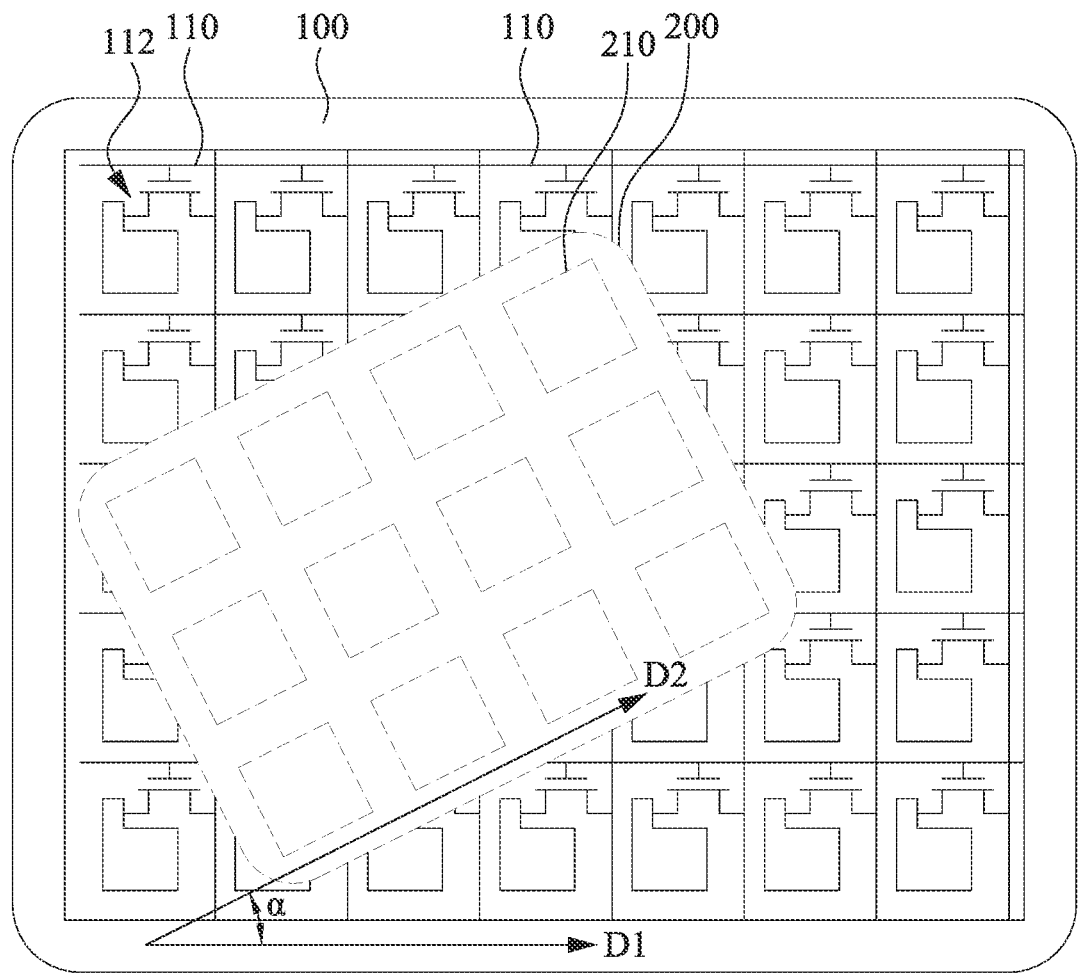
FIG. 9 is a top view of a biological feature identification device according to another embodiment of the present disclosure.

FIG. 9 is a top view of a biological feature identification device 20 according to another embodiment of the present disclosure. The biological feature identification device 20 is substantially the same as the biological feature identification device 10, and the difference is that the sensing unit 210 of the sensing device 200 of the biological feature identification device 20 is arranged along a second direction D2 that is different from the first direction D1. That is, the first direction D1 and the second direction D2 form an angle α. In the present embodiment, the biological feature identification device 20 does not satisfy the aforementioned equation (1) but satisfies the relation of spatial frequency: |4*(RE/100)−(1/SU)|≤A. Therefore, the biological feature identification device 20 can satisfy the following criteria by rotating the sensing device 200 relative to the display device 100 of the biological feature identification device 20:

$$A < |4*(RE/100) - \{1/[SU*Cos(\alpha)]\}| < C \quad \text{Equation (4)}$$

α is the angle, 0°<α<90°, C is greater than A, and A is not equal to zero.

In the present embodiment, the value of {1/[SU*Cos(α)]} in equation (4) can be increased by rotating the sensing device 200 relative to the display device 100. In other words, the arrangement irregularity between the sensing units 210 and the pixels 110 of the display device 100 can be increased by rotating the sensing device 200 so as to eliminate the effect of moire pattern. In some preferred embodiments, C is in a range of about 10 mm$^{-1}$ to 18 mm$^{-1}$.

The value of C is determined by the resolution RE and the sensing unit size SU of the display device 100. For example, in the embodiment shown in FIG. 9, of which the display device 100 and the sensing device 200 have relative angular displacement, the spatial frequency A of the biological feature is equal to 3, and the biological feature identification device 20 satisfy the following criteria:

$$3<|4*(RE/100)-\{1/[SU*Cos(\alpha)]\}|<10 \quad \text{Equation (5)}$$

When the biological feature identification device 20 satisfies equation (5), it can prevent the moire pattern that may affect image recognition precision.

In some other embodiments, the biological feature identification device 20 can be a 4K display device, such as the display device with 3840×2160 pixels or 4096×2160 pixels. The 4K display device may have different resolution that depend on sizes of various display device. With such conditions, the biological feature identification device can satisfy the following criteria:

$$3<|4*(RE/100)-(1/SU)|<18 \quad \text{Equation (6)}$$

Similarly, when the biological feature identification device 20 satisfies equation (6), it can prevent the moire pattern that may affect image recognition precision. The biological feature identification device 20 has the same advantages as those of the biological feature identification device 10, and the description is not repeated hereinafter.

Reference is made to FIG. 2, the manufacturing method of the biological feature identification device includes overlapping the display device 100 and the sensing device 200, and calculating a value of $|4*(RE/100)-(1/SU)|$ based on the resolution RE of the chosen display device 100 and the sensing unit size SU of the chosen sensing device 200. As described above, the relation between the display device 100 and the sensing device 200 can include that the display device 100 located above the sensing device 200, the display device 100 located below the sensing device 200, or the display device 100 and the sensing device 200 located on the same substrate.

When $|4*(RE/100)-(1/SU)|>3$, the method corresponding to the embodiment shown in FIG. 1 can be sued to dispose the display device 100 and the sensing device 200. That is, the first direction D1 equals to the second direction D2 such that the biological feature identification device can satisfy equation (1).

Or, when $|4*(RE/100)-(1/SU)|\leq3$, the method corresponding to the embodiment shown in FIG. 9 can be sued to dispose the display device 100 and the sensing device 200. That is, one of the display device 100 and the sensing device 200 can be rotated. Therefore, the first direction D1 and the second direction D2 form an angle α such that the biological feature identification device can satisfy equation (4). In other words, the arrangement irregularity between the sensing units 210 and the pixels 110 of the display device 100 can be increased by rotating the sensing device 200 so as to eliminate the effect of moire pattern. In other embodiment, the same advantages can be achieved by rotating the display device 100 relative to the sensing device 200.

As shown in FIG. 2, when the sensing device 200 and the display device 100 are respectively disposed on different substrates (that is, the substrate 220 and the substrate 110), the display device 100 and the sensing device 200 can be manufactured respectively first, and the display device 100 and the sensing device 200 can then be packaged together later. When the biological feature identification device does not satisfy equation (1) during the manufacturing process, one of the display device 100 and the sensing device 200 can be rotated, and it is preferred to rotate sensing device 200.

As shown in FIG. 3, when the sensing device 200 and the display device 100 are disposed on the same substrate, sizes of the display device 100 and the sensing device 200 can be calculated first based on the aforementioned equation (1)~equation (6) before manufacturing so as to reduce thickness of the biological feature identification device.

As described above, the moire pattern can be efficiently eliminated to prevent incorrect recognition and image recognition precision decreasing problem by making the biological feature identification device of the present disclosure satisfy at least one of the condition of aforementioned equation (1)~equation (6).

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A biological feature identification device, comprising:
    a display device comprising a plurality of pixels, wherein the pixels are arranged along a first direction, and at least one of the pixels has at least one sub-pixel, and wherein the sub-pixel comprises at least one display element and at least one switch element electrically connected to the display element; and
    a sensing device overlapped with the display device, wherein the sensing device comprises a plurality of sensing units respectively corresponding to the pixels, the sensing units are arranged along a second direction, and each of the sensing units has single one sensing element;
    wherein when the spatial frequency relation between the display device and the sensing device is $|4*(RE/100)-(1/SU)|>A$, the first direction and the second direction are the same, and the biological feature identification device satisfy the criteria: $A<|4*(RE/100)-(1/SU)|<B$, wherein B is in a range of about 9 mm$^{-1}$ to 11 mm$^{-1}$; and when the spatial frequency relation between the display device and the sensing device is $|4*(RE/100)-(1/SU)|\leq A$, the first direction and the second direction form an angle, and the biological feature identification device satisfy the criteria: $A<|4*(RE/100)-\{1/[SU*Cos(\alpha)]\}|<C$, wherein C is in a range of about 10 mm$^{-1}$ to 18 mm$^{-1}$; wherein RE is the resolution of the display device, SU is the sensing unit size, α is the angle, $0°<\alpha<90°$, B and $C>A$, and A is not equal to zero, and wherein A is a spatial frequency of the biological feature, and the biological feature comprises a plurality of repeating patterns, and the spatial frequency is a reciprocal of a distance between adjacent ridges or valleys of the repeating patterns of the biological feature.

2. The biological feature identification device of claim 1, wherein A is in a range of about 2 mm$^{-1}$ to 5 mm$^{-1}$.

3. The biological feature identification device of claim 1, further comprising:
    an optical adjusting layer disposed between the display device and the sensing device, and the optical adjusting layer has two shielding portions adjacent to each other and at least one light-transmitting portion between the two shielding portions, and wherein the light-transmitting portion corresponds to a portion of the at least one sensing element of each of the sensing unit.

4. A manufacturing method of a biological feature identification device, comprising:

overlapping a display device with a sensing device, wherein the display device comprises a plurality of pixels, the pixels are arranged along a first direction, at least one of the pixels has at least one sub-pixel, and the sub-pixel comprises at least one display element and at least one switch element electrically connected to the display element, and wherein the sensing device comprises a plurality of sensing units respectively corresponding to the pixels, the sensing units are arranged along a second direction, and each of the sensing units has single one sensing element;

calculating a value of |4*(RE/100)−(1/SU)|, wherein when |4*(RE/100)−(1/SU)|>A, the first direction and the second direction are the same, and the biological feature identification device satisfy the criteria: A<|4*(RE/100)−(1/SU)|<B, wherein B is in a range of about 9 $mm^{-1}$ to 11 $mm^{-1}$; or when |4*(RE/100)−(1/SU)|A, rotate one of the display device and the sensing device such that the first direction and the second direction form an angle, and the biological feature identification device satisfy the criteria: A<|4*(RE/100)−{1/[SU*Cos(α)]}|<C, wherein C is in a range of about 40 $mm^{-1}$ to 18 $mm^{-1}$;

wherein RE is the resolution of the display device, SU is a size of the sensing unit, α is the angle, 0°<α<90°, B and C>A, and A is not equal to zero, and wherein A is a spatial frequency of the biological feature, and the biological feature comprises a plurality of repeating patterns, and the spatial frequency is a reciprocal of a distance between adjacent ridges or valleys of the repeating patterns of the biological feature.

5. The manufacturing method of claim 4, wherein A is in a range of about 2 $mm^{-1}$ to 5 $mm^{-1}$.

6. The manufacturing method of claim 4, further comprising:

disposing an optical adjusting layer between the display device and the sensing device, and the optical adjusting layer has two shielding portions adjacent to each other and at least one light-transmitting portion between the two shielding portions, and wherein the at least one light-transmitting portion corresponds to a portion of the at least one sensing element of each of the sensing unit.

* * * * *